United States Patent [19]

Abe et al.

[11] 4,377,003
[45] Mar. 15, 1983

[54] TESTING DEVICE FOR ELECTRONIC CIRCUITS AND ESPECIALLY FOR PORTABLE RADIOS

[75] Inventors: Hideaki Abe; Koji Yamashita, both of Tokyo, Japan

[73] Assignee: Nippon Electric Co., Ltd., Tokyo, Japan

[21] Appl. No.: 159,154

[22] Filed: Jun. 13, 1980

[30] Foreign Application Priority Data

Jun. 19, 1979 [JP] Japan ............................ 54-83831[U]

[51] Int. Cl.³ ...................... H04B 1/034; H04B 1/08
[52] U.S. Cl. .................................... 455/90; 455/226;
455/351; 324/51; 324/73 PC
[58] Field of Search .................... 455/89, 90, 95, 115,
455/127, 128, 226, 334, 347, 343, 348, 351;
324/51, 52, 73 PC, 123 R, 124

[56] References Cited
U.S. PATENT DOCUMENTS

| | | | |
|---|---|---|---|
| 2,912,574 | 11/1959 | Gensel | 455/351 |
| 2,941,161 | 7/1960 | Scantlin | 455/351 |
| 2,963,577 | 12/1960 | Errichiello | 455/351 |
| 3,550,008 | 12/1970 | Bright | 455/351 |
| 3,611,156 | 10/1971 | Ward | 455/343 |
| 3,668,528 | 6/1972 | Hutchinson | 455/351 |
| 3,737,782 | 6/1973 | Pierce | 455/226 |
| 3,763,434 | 10/1973 | Blesch | 455/351 |
| 3,969,796 | 7/1976 | Hodsdon | 455/90 |
| 4,084,037 | 4/1978 | Morton | 455/127 |
| 4,107,611 | 8/1978 | Holcomb | 455/95 |
| 4,213,078 | 6/1980 | Ferrell | 455/343 |

Primary Examiner—Tommy P. Chin
Attorney, Agent, or Firm—Laff, Whitesel, Conte & Saret

[57] ABSTRACT

The battery compartment of a portable radio includes contacts which are to be connected to one electrode of the battery. A test terminal adjacent the contact and connected to the electronic circuit of the device. The contact and the test terminal are interconnectible by means of an auxiliary connector, which includes a magnet. To place the electronic circuit in condition for carrying out a test operation, that is, in a condition to receive the source voltage in continuous fashion, the magnet is laid on the battery with the auxiliary connector bridging the contact and test terminal.

6 Claims, 6 Drawing Figures

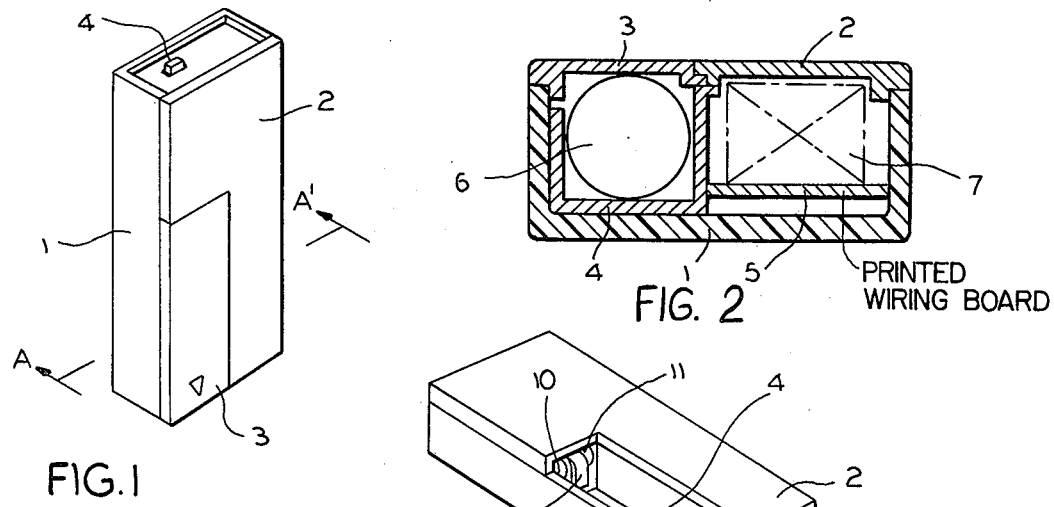
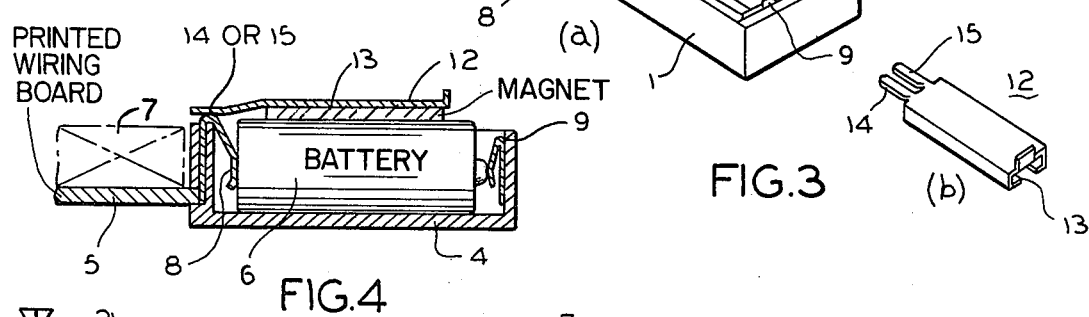
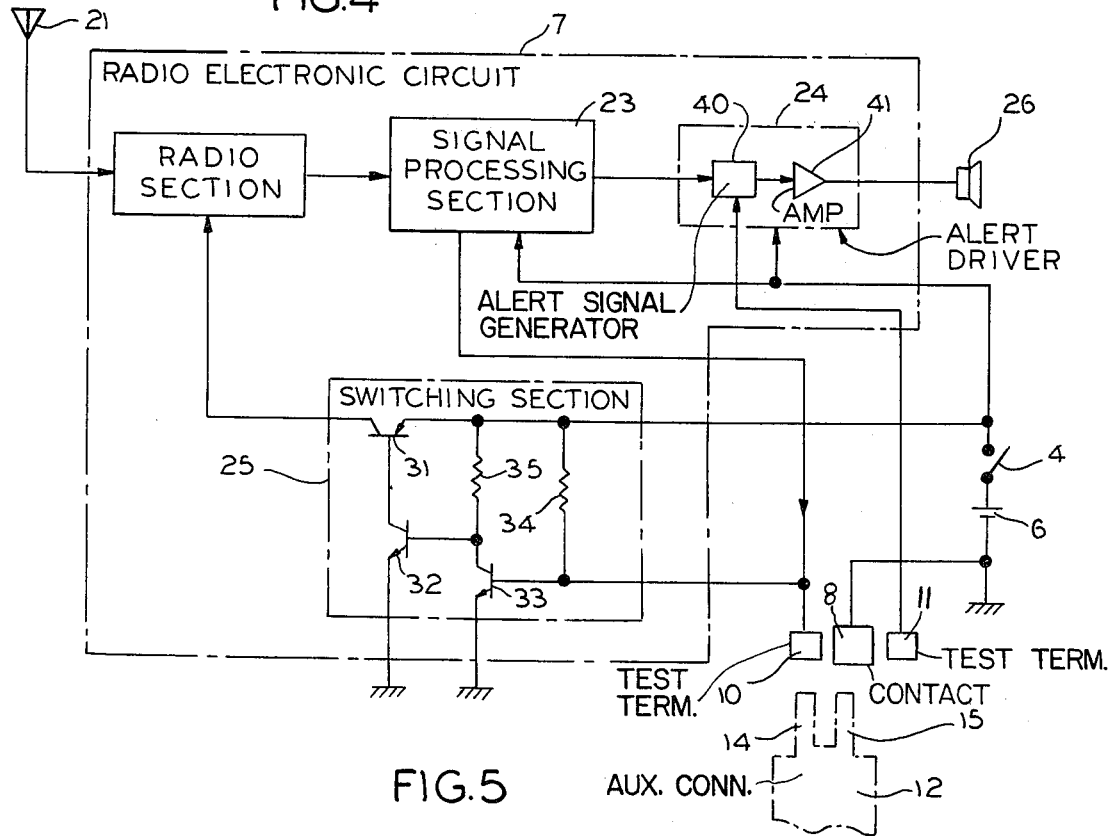

ered is placed in proximity to or removed from a battery housing. The leaf spring contact is therefore normally spaced apart from the electrode of the battery but when the magnet is brought into place, the magnetic attraction brings the contact into electrical engagement with the electrode.

TESTING DEVICE FOR ELECTRONIC CIRCUITS AND ESPECIALLY FOR PORTABLE RADIOS

BACKGROUND OF THE INVENTION

1. Field of the Invention

The present invention relates to the structure of portable communication devices such as radio pagers and transceivers, including a test terminal.

2. Description of the Prior Art

Heretofore, communication devices of the type concerned have prinicipally comprised a housing having a battery compartment, a radio electronic circuit mounted on a printed wiring board and a removable cover structure. Generally, such communication device has a test or checkpoint or points formed on the printed wiring board. Instruments may be connected to these points for making circuit adjustment, inspection and examination of the radio electronic circuit. A terminal and switch means are also incorporated on the wiring board.

Accordingly, adjustment, testing and similar procedures can be performed on the radio electronic circuit in its unbuilt-in state, as by an application of a definite voltage to the terminal, along with a measuring instrument and a switch operation. However, once the radio circuit and other components have been installed and enclosed in the housing by a cover means, no testing or adjustment can be performed unless the radio circuit or other component is taken out of the housing at the expense of much labor. Further, such a communication device often exhibits different electrical characteristics depending upon whether the radio circuit is or is not mounted in the housing. Such a variation in characteristics is substantial, particularly with communication devices having a combined housing and antenna structure (for example, see U.S. Pat. Nos. 4,123,756 and 3,736,591). Thus, it has often been practically impossible to carry out any testing, adjustment or similar operation, correctly.

SUMMARY OF THE INVENTION

An object of the present invention is to provide a portable communication device structure which includes a test terminal and is free of the difficulties previously encountered, as described above.

According to the present invention, a portable communication device of the type concerned has a battery compartment defined in a portion of the housing or the like structure. A contact member is positioned to be connected to one electrode of the battery, when it is accommodated in the compartment. A test terminal is arranged adjacent to the contact member and connected to the radio electronic circuit. The contact member and the test terminal are interconnectible to place the radio electronic circuit in a condition for a test operation. As a further feature, the portable communication device includes an interconnection between the contact member and the test terminal. An auxiliary connector includes a magnet and a connecting terminal secured integrally thereto. This magnet and contact establish the interconnection between the contact member and the test terminal, through the intermediary of the connecting terminal when the magnet is removably mounted directly on the battery, accommodated in the compartment.

The above and other objects, features and advantages of the present invention will become apparent from the following description taken in conjunction with the accompanying drawings.

BRIEF DESCRIPTION OF THE DRAWINGS

In the drawings:

FIG. 1 is an perspective view showing the appearance of a preferred form of portable communication device embodying the present invention;

FIG. 2 is a cross-sectional view taken along the line A-A' in FIG. 1;

FIGS. 3a and 3b are prospective views illustrating the structure of the portable communication device shown in FIGS. 1 and 2; and FIG. 3a illustrates the structure of the battery compartment with the cover therefor removed, FIG. 3b illustrates an auxiliary connector for test use on the structure;

FIG. 4 is a fragmentary cross-sectional view showing the auxiliary connector placed in service condition; and FIG. 5 is a circuit diagram of the communication device of the present invention, showing the test terminals of the auxiliary connector in broken lines in a position for connection.

DESCRIPTION OF THE PREFERRED EMBODIMENT

In FIGS. 1 and 2, the portable communication device has a housing 1 in which a radio electronic circuit 7 is mounted. The circuit 7 is mounted on a printed wiring board 5 in that portion of housing 1 which is covered by a cover plate 2. Formed on a portion of the printed wiring board 5 is a battery compartment 4 which accommodates a battery 6 and is covered by a removable cover 3. As clearly seen in FIG. 3a, leaf spring contacts 8 and 9 are provided in the battery compartment 4, at its opposite ends, for making a contacting engagement with the negative (−) and positive (+) electrodes of battery 6, respectively. Adjacent to the leaf spring contact 8 are test terminal strips 10 and 11 which are connected to the radio circuit 7. For example, the test strips leads to a battery saving circuit and a alert circuit for testing their respective intended functions, as will be described later in detail.

Illustrated in FIG. 3b is an auxiliary connector 12 for test use. Connector 12 comprises a magnet 13 and connecting metal terminals 14 and 15 which are secured to the magnet. When in use, the connector 12 is placed over the battery 6, as shown in FIG. 4, in direct engagement with its tubular metallic casing, where it is held under the attraction of magnet 13. The terminals 14 and 15 are brought into resilient contact with the test terminal strip 10 and leaf spring contact 8, respectively, or with the contact 8 and test terminal strip 11, respectively. These terminals connect the test terminal strip 10 or 11 to ground on contact 8. By such a grounding connection, the battery saving circuit, which will be described hereinafter, is switch OFF or the alert circuit is activated so that the communication device can be tested to determine whether it operates normally or not.

A description will next be made of the circuit operation in the testing of the communication device, with reference to the circuit diagram of FIG. 5.

In the "stand-by" or idle state of the communication device, the switching section 25, responds to pulses having definite relative intervals which are received from the signal processing section 23. Section 25 is operative to supply the voltage of battery 6 to the radio section 22 in an intermittent fashion. The switching section 25 comprises transistors 31 to 33 and resistors 34 and 35. When, in the described state, modulated waves (such as carrier waves modulated by a selective calling signal train) are received at the antenna 21, demodulated at the radio section 22, and selectively decoded at the signal processing section 23. The switching section 25 is fed with a low DC level from the signal processing section 23 to supply the source voltage to the radio section 22. Under this state, the selective calling signal train is received, demodulated and decoded, in order.

If it is determined that the calling signal train is the one assigned to the communication set, the signal processing section 23 starts to supply the low DC level to the alert signal generator 40 in the alert driver circuit 24, for a predetermined length of time. The alert signal from the alert signal generator 40 is amplified by an amplifier 41 and fed to the speaker 26, produces an alerting sound. For pagers with such battery saving means, reference may be had, for example, to U.S. Pat. Nos. 2,912,574; 3,611,156; and 3,783,384.

For shipping or maintenance of such communication devices, it is necessary in advance, to test or examine the circuit sections to determine whether they do or do not operate properly. In the idle state of the device, however, it has usually been very difficult to test the radio section 22 because the source voltage is intermittently fed thereto. This difficulty can be overcome, according to the present invention, by connecting the terminals 14 and 15 of connector 12 to the terminal strip 10 and contact 8, respectively, thereby feeding the low DC level to the transistor 33 and switching ON the transistor 31 so that the source voltage is fed continuously to the radio section 22. Under this condition, the radio section 22 can be tested efficiently, with ease, and in a short time period.

Also, in the testing of the alert section, including alert driver 24 and speaker 26, it has previously been usual that no alert signal is given until the calling signal train is received and demodulated by the radio section 22, and has been selected and decoded in the signal processing section 23. This means that the testing procedure becomes complicated, requiring a greatly extended time for the testing.

According to the present invention, the alert section can be tested efficiently by connecting the terminals 14 and 15 of connector 12, respectively, to the contact 8 and terminal strip 11. By doing this, the terminal strip 11 is grounded. The alert signal generator 40 is activated to produce an alert signal irrespective of the output of the signal processing section 23. In this manner, the testing or examination of the alert section can easily be accomplished in a short period of time.

It will be appreciated that, because of the structure described herein, the communication device of the present invention can be tested even when mounted in the housing 1 and covered by the cover plate 2, as shown in FIG. 3a.

According to the present invention, even when the radio circuit of the communication device is taken out of the housing 1, as illustrated in FIG. 4, the different components of the device can be tested, examined or inspected in only a limited length of time simply by laying the auxiliary connector on the tubular metallic casing of the battery.

Though one preferred embodiment of the present invention has been shown and described herein, it will be apparent to those skilled in the art that various changes and modifications may be made therein without departing from the spirit or scope of the invention as defined in the appended claims.

What is claimed is:

1. A portable communication device comprising a housing, a battery compartment defined in a portion of said housing to receive a battery, and an electronic circuit mounted in said housing, an auxiliary connector means for test use, said auxiliary connector means including a magnet and a connecting terminal, said battery compartment including a contact for making a connection to one electrode of said battery when it is mounted in said battery compartment and a test terminal means adjacent said contact and connected to said electronic circuit, said auxiliary connector means interconnecting said contact and said test terminal to place said electronic circuit in a condition for conducting a test operation when said auxiliary connector means is mounted over said battery compartment responsive to the attraction of said magnet.

2. A portable communication device comprising a housing, a printed wiring board mounted in said housing, an electronic circuit mounted on said printed wiring board and a battery compartment on a portion of said printed wiring board to receive a battery, an auxiliary connector for test use, said auxiliary connector including a magnet and a connecting terminal, said battery compartment including a contact for making a connection to one electrode of said battery in said compartment and a test terminal adjacent said contact and connected to said electronic circuit, said contact and said test terminal being interconnected through said connecting terminal of said auxiliary connector to place said electronic circuit in condition for conducting a test operation when said auxiliary connector is removably mounted over said battery compartment under an attraction of said magnet.

3. A device for testing electronic equipment comprising a battery compartment having a plurality of terminal contacts associated therewith, means for connecting at least one of said terminal contacts to a circuit test point in said electronic equipment, audible signal means, means for connecting at least another one of said terminal contacts to said audible signal means, means for applying battery power to still another of said terminal contacts, separate means which is positionable for selectively bridging predetermined ones of said terminal contacts in order to by-pass at least some of said electronic equipment and to enable a sounding of said audible signal means for test purposes, said separate means comprising a plate-like conductive member with projecting extensions configured to engage selected ones of said terminal contacts, and magnetic means attached to said plate-like conductive member for securely holding said plate in association with said battery compartment, in said bridging position.

4. The device of claim 3 wherein said electronic equipment is included in a portable radio receiver which responds to coded call signals, and said audible signal means gives a calling signal when said receiver detects a signal having its incoming code.

5. The device of either claim 3 or 4 wherein said plate-like member and said magnetic means are shaped and proportioned to cling to a case of a battery used to power said electronic equipment, when said battery is in an operating position within said battery compartment.

6. The device of claim 5 wherein said electronic equipment is mounted to be used either within a housing or at an extended position outside of said housing, whereby test procedures may be used both before and after assembly of the device.

* * * * *